United States Patent [19]

Maruyama et al.

[11] Patent Number: 4,527,752

[45] Date of Patent: Jul. 9, 1985

[54] FISHING SPINNING REEL

[75] Inventors: Kenji Maruyama; Konin Sazaki, both of Fuchu, Japan

[73] Assignee: Ryobi Limited, Fuchu, Japan

[21] Appl. No.: 574,289

[22] Filed: Jan. 26, 1984

[51] Int. Cl.³ ............................................. A01K 89/01
[52] U.S. Cl. .................................................. 242/84.2 G
[58] Field of Search .................... 242/84.2 G, 84.2 F, 242/84.21 R

[56] References Cited

U.S. PATENT DOCUMENTS

| | | | |
|---|---|---|---|
| 2,863,617 | 12/1958 | Chapin et al. | 242/84.21 R |
| 3,550,874 | 12/1970 | Sarah | 242/84.2 G |
| 4,337,905 | 7/1982 | Sazaki | 242/84.2 G |
| 4,426,045 | 1/1984 | Gifford | 242/84.2 G |

Primary Examiner—Billy S. Taylor
Attorney, Agent, or Firm—Frishauf, Holtz, Goodman & Woodward

[57] ABSTRACT

A fishing spinning reel in which a bail arm has opposite ends secured to a bail arm lever and a bail arm cam, the bail arm lever and the bail arm cam being rotatably shouldered on a pair of opposing arms of a rotor. The bail arm is rotatable from a line-casting position to a line-rewinding position. A first kick lever is provided for rotating the bail arm from its line-casting position to an intermediate position upon the rotation of a handle of the fishing spinning reel. A second kick lever is provided for rotating the bail arm from its intermediate position to its line-rewinding position upon successive rotation of the handle of the fishing spinning reel.

12 Claims, 18 Drawing Figures

FISHING SPINNING REEL

BACKGROUND OF THE INVENTION

This invention relates to a fishing spinning reel, and more particularly to a bail arm reversing device suitable for an outer-spool type fishing spinning reel.

In an outer-spool type fishing spinning reel, it is necessary for a bail arm to have a larger swinging angle than in an inner-spool type reel in order to avoid the contact of a line with a bail arm during a casting operation. Otherwise, a line being payed out may be damaged or broken.

In the prior art bail arm reversing devices, however, reversing movement of a bail arm against the resilient force of a torsion spring biasing the bail arm to its line-casting position is caused by engagement between a kick lever connected to a bail arm lever or a bail arm cam and a kick boss secured to a reel body, through the whole swinging angle thereof. Accordingly, if the swinging angle of the bail arm is increased, a larger force is required to initially rotate a handle to automatically reverse a bail arm to its line-rewinding position. Further, it sometimes becomes necessary to once rotate a handle in the opposite direction and then rotate it in the desired direction to reverse a bail arm having momentum. This disturbs quick response to the fight of fish.

OBJECT OF THE INVENTION

It is therefore an object of the present invention to provide an improved fishing spinning reel capable of reversing a bail arm at a larger swinging angle without increasing the force required to rotate the operating handle of the fishing reel.

DETAILED DESCRIPTION

Figures 1, 2:
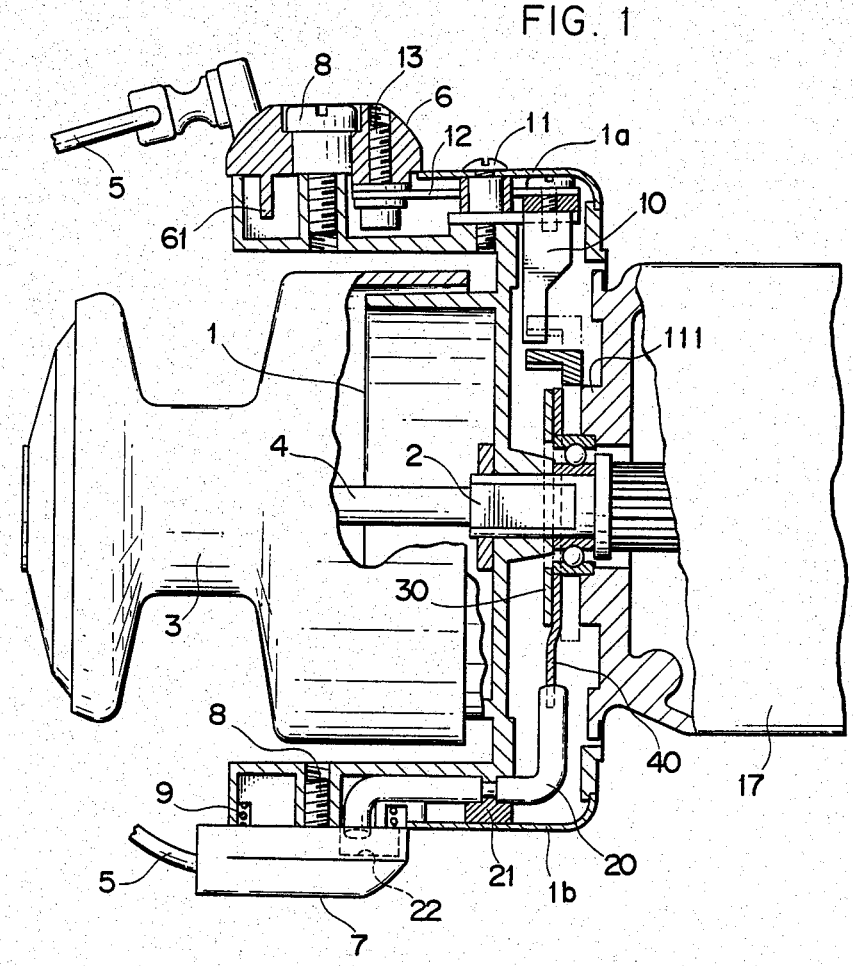
FIG. 1 is a partially-cut side view showing the outer spool type fishing spinning reel embodying the invention.
FIG. 2 is a perspective view of a first kick lever.
Figure 3:
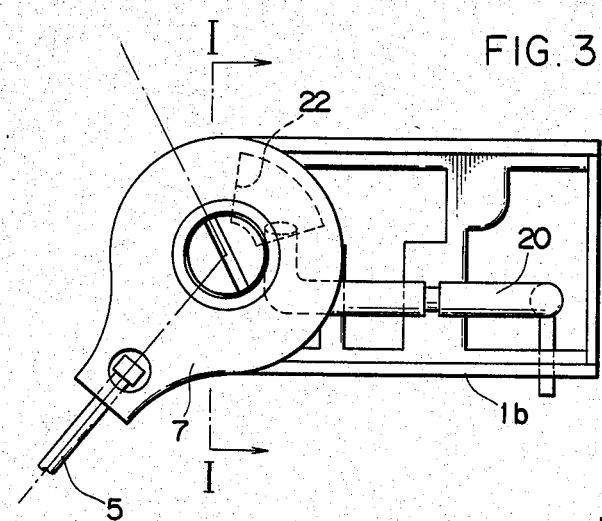
FIG. 3 is an explanatory view showing the relationship between a bail arm cam and a first kick lever.
Figure 4:
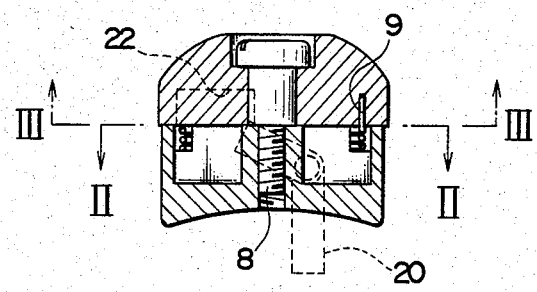
FIG. 4 is a sectional view of FIG. 3 taken along the line I—I.
Figure 5:
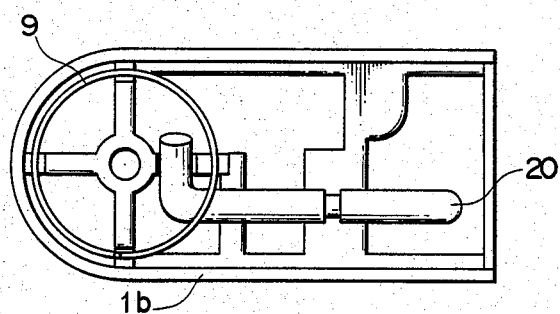
FIG. 5 is a sectional view of FIG. 4 taken along the line II—II.
Figure 6:
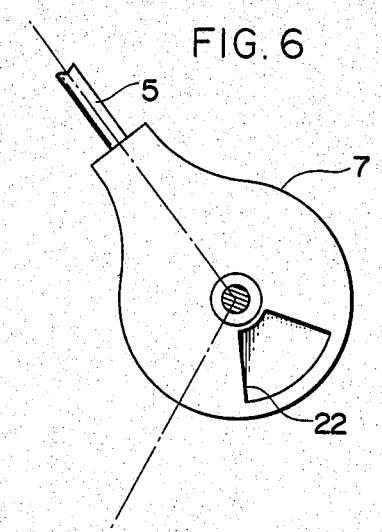
FIG. 6 is a sectional view of FIG. 4 taken along the line III—III.

In a fishing spinning reel shown in FIG. 1, a rotor 1 is rotated by a rotary shaft 2 and a spool 3 is moved reciprocally in forward and rearward directions by a spool shaft 4 upon the rotation of a handle, not shown, such as the handles shown in copending application Ser. No. 401,901, filed July 26, 1982, or in U.S. Pat. Nos. 4,098,473, or 4,147,313, the entire contents of which are incorporated herein by reference.

A bail arm 5 is secured at its opposite ends to a bail arm lever 6 and a bail arm cam 7 which are rotatably shouldered by step screws 8 on a pair of diametrically opposing arms 1a and 1b of the rotor 1, respectively. The bail arm 5 is swingable between line-casting and line-rewinding positions. It is biased toward its line-casting position by a torsion spring 9 arranged between the arm 1b and the bail arm cam 7.

A first kick lever 20, shown in FIGS. 1 and 2, is mounted inside the arm 1b. The kick lever 20 is rotatably supported on boss 21 which inwardly protrudes from the inner surface of the arm 1b, at the intermediate portion 20c (FIG. 2) thereof. Both end portions 20a and 20b of kick lever 20 are bent in different directions, as shown in FIG. 2. The bent portion 20a extends toward the rotary shaft 2 while the bent portion 20b extends into a recess 22 formed inside the bail arm cam 7 so as to be able to come into contact with the inner wall of the recess 22, as shown in FIGS. 3 to 6.

Figure 7:
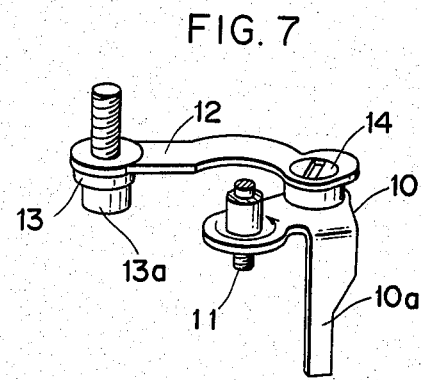
FIG. 7 is a perspective view of a second kick lever and interconnected parts thereof.

A second kick lever 10, shown in FIGS. 1 and 7, is rotatably pivoted to the inner wall of the arm 1a by a screw 11. The bent plate 10a of the kick lever 10 extends toward the rotary shaft 2. A link lever 12 is arranged inside the arm 1a, one end of which is secured to the inner surface of the bail arm lever 6 by a screw 13 while the other end is secured to the kick lever 10 by a screw 14.

Figure 8:
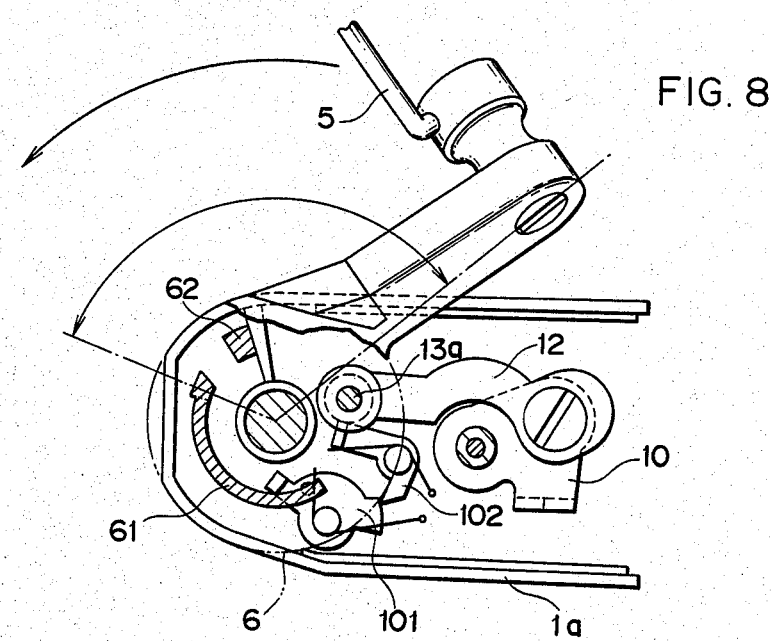
FIG. 8 shows a stopper mechanism of the bail arm lever.

Between the bail arm lever 6 and the arm 1a of the rotor 1, as shown in FIG. 8, a stopper mechanism for locking the bail arm 5 at its line-rewinding position is arranged. The stopper mechanism comprises an arcuate cam 61 and a boss 62 downwardly formed on the inner surface of the bail arm lever 6, a first stopper 101 and a second stopper 102 formed on a bottom surface of the arm 1a, and a pin 13a downwardly extending from the bottom end of the screw 13, which operates substantially the same as disclosed in copening U.S. patent application Ser. No. 401,901, filed July 26, 1982.

Figure 9:
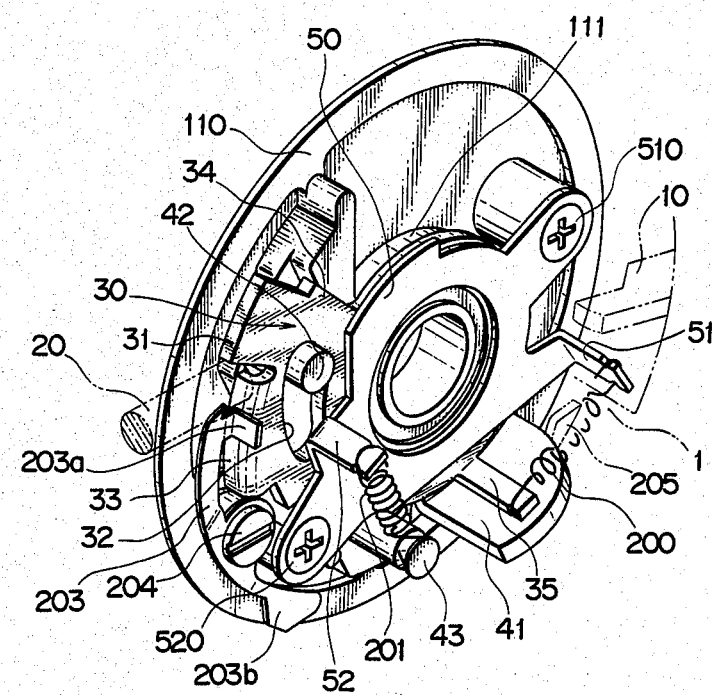
FIG. 9 is a perspective view showing the relationship of the first and second kick levers.
Figure 10:
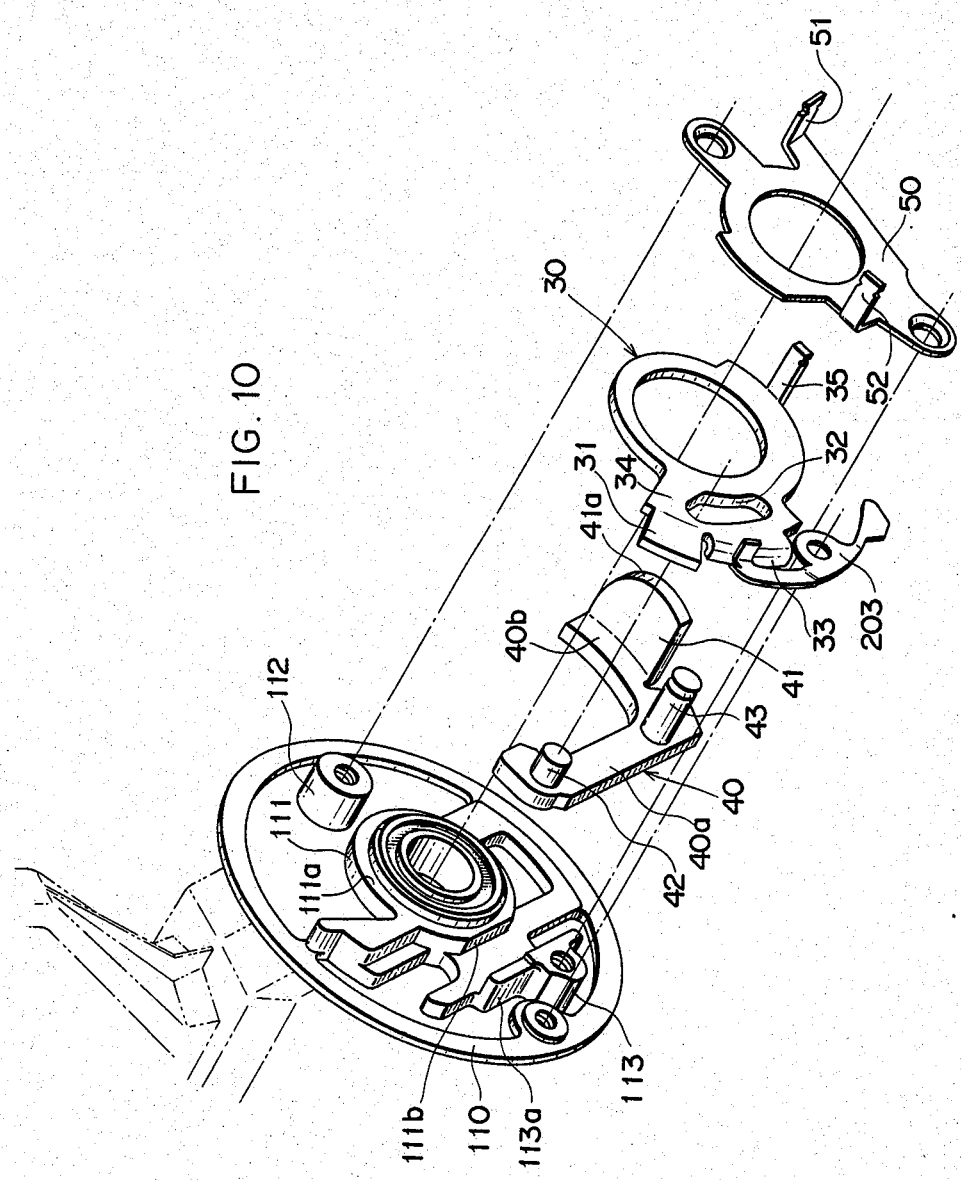
FIG. 10 is a disassembled perspective view of FIG. 9.

As shown in FIGS. 9 and 10, a central boss 111 and a pair of screw beds 112 and 113 are formed on a front disc plate 110 of the reel body 17. The central boss 111 has a step 111a at its intermediate peripheral surface and a straight-cut portion 111b at its lower peripheral surface. The screw bed 113 is provided with a side wall 113a opposed to the straight-cut portion 111b to form a spacing therebetween.

A first kick plate 30 (see FIGS. 9 and 10) having a kick boss 31, a cam slot 32 and a downwardly bent portion 33 at its protruded portion 34, is relatively rotatably mounted on the step 111a of the central boss 111. Relative movement of the kick plate 30 in the axial direction of the central boss 111 is prevented by a cover plate 50 secured to the screw beds 112 and 113 by a pair of screws 510 and 520.

As shown in FIG. 10, a second kick plate 40 in the shape of an inverted L is slidably received at its one leg 40a in the spacing between the straight-cut portion 111b of the central boss 111 and the side wall 113a of the screw bed 113. An upwardly bent kick boss 41 having an arc-shaped peripheral surface 41a is provided on the other leg 40b of the second kick plate 40. A pin 42 is mounted on the one leg 40a to be received inside the cam slot 32 of the first kick plate 30 so that the second kick plate 40 is operatively connected to the first kick plate.

The first kick plate 30 is biased to rotate in the counter-clockwise direction by the resilient force of a spring 200 connected between a lug 51 of the cover plate 50 and a lug 35 of the first kick plate 30. The second kick plate 40 is, on the contrary, biased to rotate in the clockwise direction by the resilient force of a spring 201 connected between a lug 52 of the cover plate 50 and a pin or lug 43 of the second kick plate 40.

A stopper 203 (FIG. 9) is swingably secured to the disc plate 110 of the reel body 17 by a screw 204 at the center thereof. One end 203a of stopper 203 is engageable with the bent portion 33 of the first kick plate 30 while the other end 203b of stopper 203 is engageable with a protrusion 205 of the rotor 1.

The above constructed bail arm reversing mechanism operates as follows.

Figure 11:
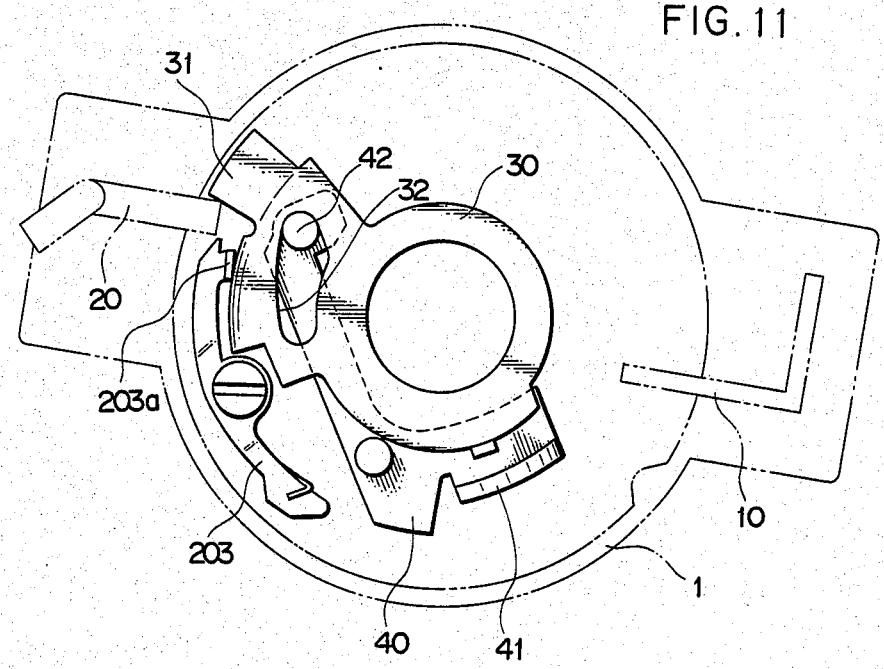
FIGS. 11-13 are explanatory views showing the relationship among a pair of kick levers and a pair of kick plates during the bail arm reversing operation.
Figure 12:
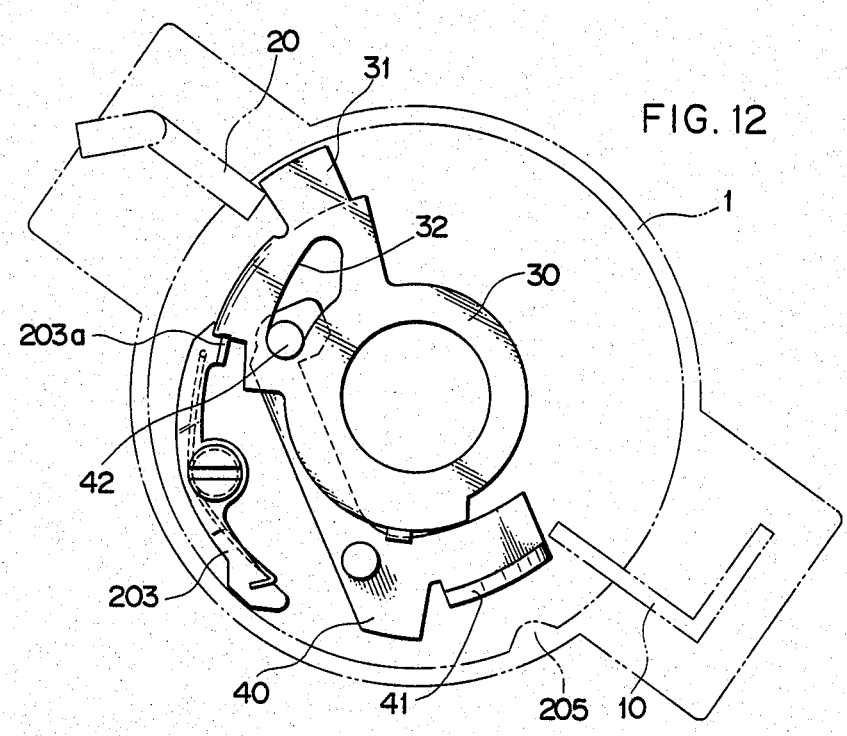
Figure 14:
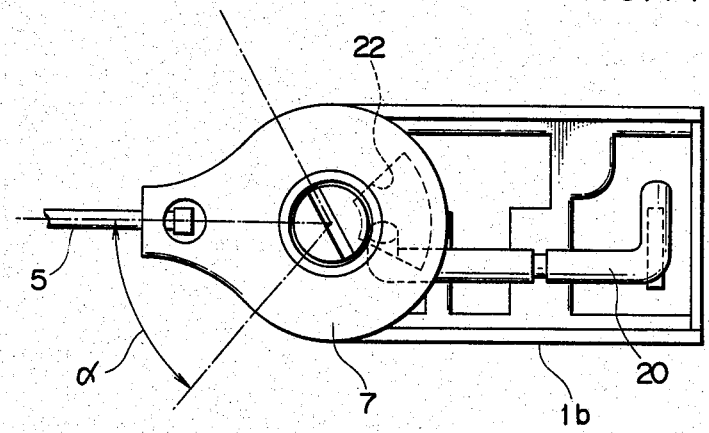
FIGS. 14 and 15 are explanatory views showing the relationship between the bail arm cam and the first kick lever during the bail arm reversing operation.
Figure 17:
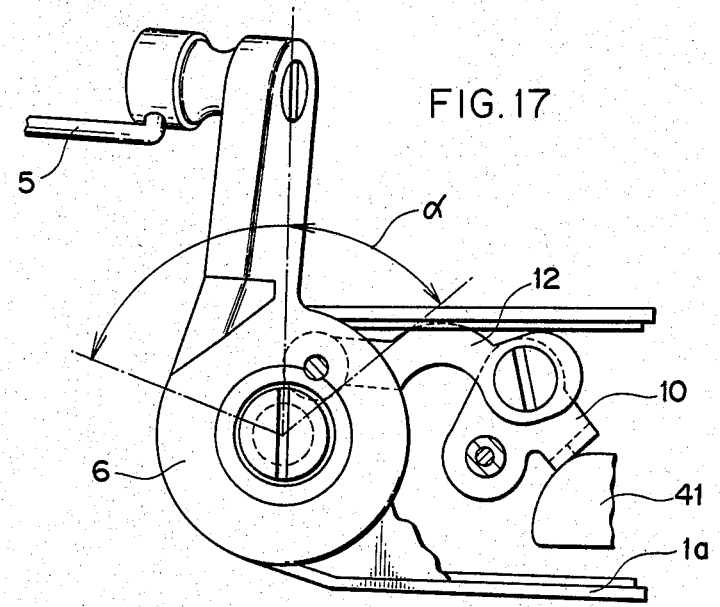
FIGS. 17 and 18 are explanatory views showing the relationship between the bail arm lever and the second kick lever.

When the rotor 1 is rotated, while the bail arm 5 is in its line-casting position, the kick lever 20 pushes the kick boss 31 of the kick plate 30 to rotate the latter in the clockwise direction in FIG. 11 about the central boss 111. Upon the rotation of the first kick plate 30, the pin 42 of the second kick plate 40 is guided by the cam slot 32 of the first kick plate 30 so that the second kick plate 40 moves downwardly in FIG. 11 along the straight-cut portion 111b of the central boss 111 against the resilient force of the spring 201. The cam slot 32 is formed such that when the first kick plate 30 is rotated in the clockwise direction as viewed in FIG. 11, the pin 42 of the second kick plate 40 is smoothly guided down. That is, the function of the cam slot 32 is to convert the rotary movement of the first kick plate 30 into straight movement and transmit it to the second kick plate 40 by guiding the pin 42 along the inner periphery of the cam slot 32. Then, the second kick plate 40 reaches the position where the kick boss 41 is, as shown in FIG. 12, able to contact the kick lever 10. At this stage, one end 203a of the stopper 203 engages one side of the bent-portion 33 of the first kick plate 30 to prevent the latter from rotating in the counter-clockwise direction by the resilient force of the spring 200. Upon further rotation of the rotor 1, the kick boss 31 pushes, on the contrary, the kick lever 20 in the counter-clockwise direction in FIG. 12 to rotate the latter from the position shown in FIG. 3 to that shown in FIG. 14, whereby the bail arm 5 is rotated over an angle α. The first kick lever 20 pushes the first kick boss 31 until further rotation of the first kick plate 30 is prevented by the engagement of the pin 42 and one end of the cam slot 32. At this stage, referring to FIG. 12, with further rotation of the kick lever 20, the kick lever 20 receives a reaction force from the kick boss 31 so that the kick lever 20 rotates, in turn, in the clockwise direction in FIG. 12 about its rotary center. At or before the time the bail arm 5 reaches the position shown in FIG. 14, the second kick boss 41 comes into contact with the kick lever 10 to further rotate the latter from the intermediate position shown in FIG. 17 to the final position shown in FIG. 18 . Thus, the bail arm 5 is rotated over the total angle β to its line-rewinding position.

Figure 15:
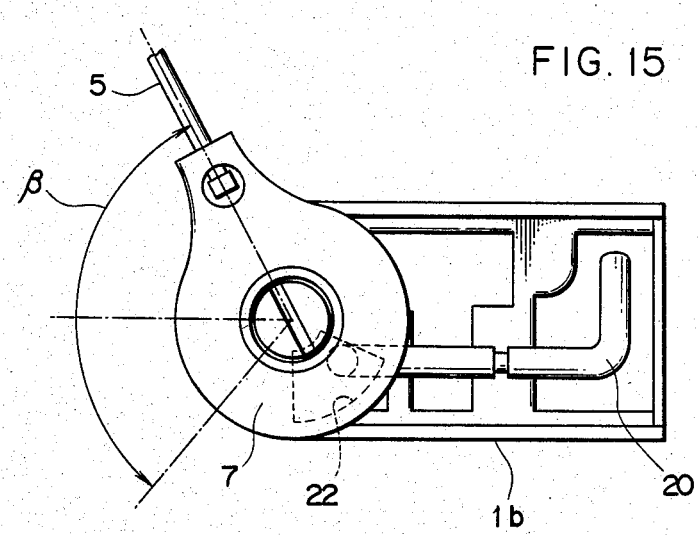
Figure 16:
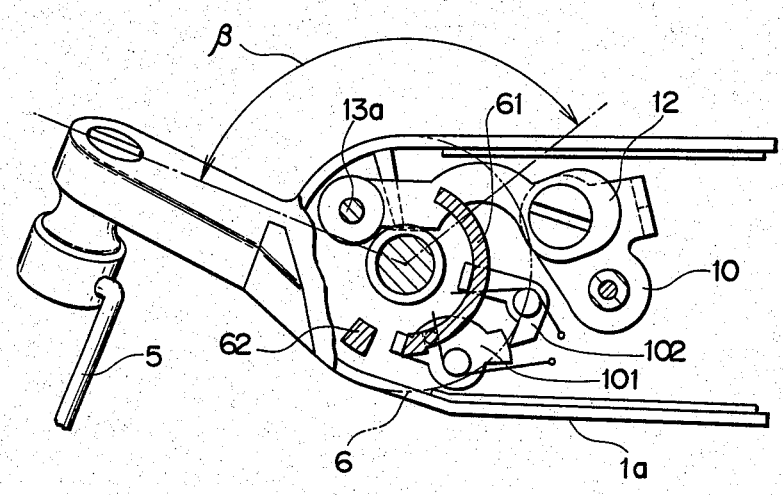
FIG. 16 shows the bail arm lever locked in its line-rewinding position by a stopper mechanism.
Figure 18:
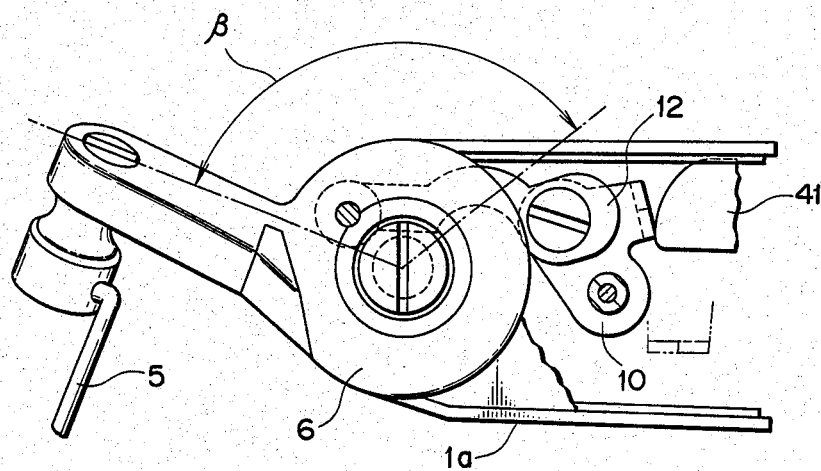

When the bail arm 5 is rotated over the total angle β, the first kick lever 20 is positioned as shown in FIG. 15, and the bail arm lever 6 is, as shown in FIG. 18, locked at its line-rewinding position by the stopper mechanism against the biasing force of the spring 9.

Figure 13:
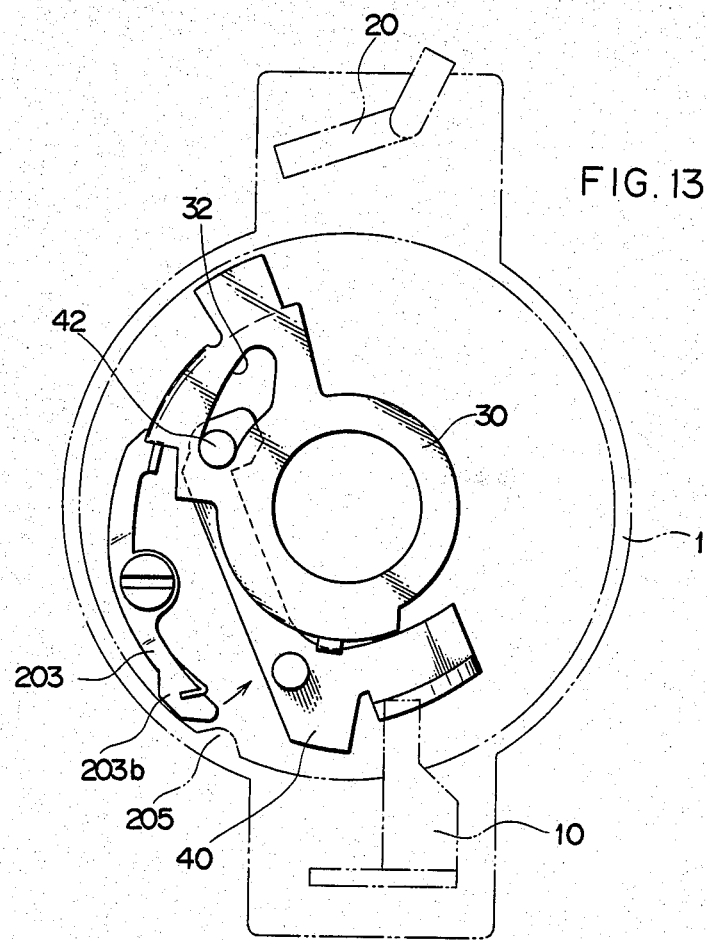

Upon a further rotation of the rotor 1 in FIG. 13, the other end 203b of the stopper 203 engages the protrusion 205 so that the stopper 203 is pivoted in the counter-clockwise direction so as to be released from engagement with the first kick plate 30, whereby the first kick plate 30 is rotated in the counter-clockwise direction by the resilient force of the spring 200 to be returned to its original position and the second kick plate 40 is also returned to its original position with the guidance of the cam slot 32.

While the invention has been described above with respect to a specific embodiment, various modifications and alterations can be made within the scope of the appended claims.

We claim:

1. A fishing spinning reel, comprising:

a main reel body including a central boss formed on a front of said reel body;

a rotor supported by said main body and provided with a pair of arms formed on a periphery of said rotor at diametrically opposing positions of said rotor;

a bail arm lever and means for rotatably mounting said bail arm lever on one of said arms of said rotor;

a bail arm cam and means for rotatably mounting said bail arm cam on the other of said arms of said rotor;

a bail arm having opposite ends, one of said opposite ends being secured to said bail arm lever and the other of said opposite ends being secured to said bail arm cam;

said bail arm being rotatable from a line-casting position to an intermediate position, and then from said intermediate position to a line-rewinding position upon rotation of a rotatable member of said fishing spinning reel;

first means for rotating said bail arm from said line-casting position to said intermediate position upon rotation of said rotatable member of said fishing reel;

said first means comprising a first kick boss mounted for relative rotation on the central boss of said reel body and means for biasing said first kick boss in the counter direction of rotation of said rotor, and a first kick lever mounted for rotation on one of said arms of said rotor, said first kick lever having one end which is engageable with an inner recess formed on the corresponding one of said bail arm lever and said bail arm cam, and said first kick lever having another end which is adapted to contact with said first kick boss when said rotor is rotated while said bail arm is at its line-casting position;

second means for successively rotating said bail arm from said intermediate position of said bail arm to said line-rewinding position of said bail arm upon successive rotation of said rotatable member of said fishing spinning reel;

said second means comprising a second kick boss mounted for reciprocal movement with respect to said first kick boss upon rotation thereof, and a second kick lever swingably mounted on the other one of said arms of said rotor, said second kick lever having one end which is interconnected with the other one of said bail arm lever and said bail arm cam, and said second kick lever having another end which is adapted to contact with said second kick boss after said bail arm is rotated to said intermediate position thereof for rotating said bail arm from said intermediate position to said line-rewinding position.

2. The fishing spinning reel of claim 1, wherein said first means comprises a first kick plate having said first kick boss thereon; and wherein said second means comprises a second kick plate having said second kick boss thereon and means for mounting, said first and second kick plates for rotation about the same axis adjacent each other.

3. The fishing spinning reel of claim 2, further comprising means for securing both said first and second kick plates to said center boss of said reel body.

4. The fishing spinning reel of claim 2, wherein said second kick plate is in the shape of a letter "L" and wherein one leg of said L-shaped kick plate is engageable with said second kick lever after said bail arm is rotated to said intermediate position.

5. The fishing spinning reel of claim 4, wherein said first kick plate of said first means has a cam slot formed therein, and said second kick plate of said second means has a projection thereon extending into said cam slot of said first kick plate for operatively connecting said first kick plate to said second kick plate.

6. The fishing spinning reel of claim 2, wherein said first kick plate of said first means has a cam slot formed therein, and said second kick plate of said second means has a projection thereon extending into said cam slot of said first kick plate for operatively connecting said first kick plate to said second kick plate.

7. The fishing spinning reel of claim 2, wherein said first kick lever comprises a generally rod-shaped member having an elongated portion which extends along a given axis, and bent ends at opposite ends thereof, said bent ends extending in different directions, and including means for mounting said first kick lever for rotation about said axis along which said elongated portion extends.

8. The fishing spinning reel of claim 7, wherein said second kick lever is in the shape of a letter "L", and including means for pivotally mounting said second kick lever to said other one of said arms of said rotor.

9. The fishing spinning reel of claim 8, wherein said first and second kick levers are mounted on diametrically opposite sides of said rotor.

10. The fishing spinning reel of claim 2, comprising spring means for biasing said first kick plate to return said first kick plate to its original position after swinging of said bail arm from said line-casting position to said line-rewinding position.

11. The fishing spinning reel of claim 10, comprising spring means for biasing said second kick plate against the direction of movement thereof caused by said first kick plate.

12. The fishing spinning reel of claim 2, comprising spring means for biasing said second kick plate against the direction of movement thereof caused by said first kick plate.

* * * * *